United States Patent
Ikeda et al.

(10) Patent No.: US 10,774,763 B2
(45) Date of Patent: Sep. 15, 2020

(54) CONTROLLER AND CONTROL METHOD FOR INTERNAL COMBUSTION ENGINE

(71) Applicant: TOYOTA JIDOSHA KABUSHIKI KAISHA, Toyota-shi, Aichi-ken (JP)

(72) Inventors: Yuto Ikeda, Toyota (JP); Yuki Nose, Kasugai (JP); Hirofumi Hashinokuchi, Toyota (JP); Tatsuaki Suzuki, Toyota (JP); Keiichi Myojo, Okazaki (JP); Eiji Ikuta, Oobu (JP); Hirokazu Ando, Kariya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/459,668

(22) Filed: Jul. 2, 2019

(65) Prior Publication Data
US 2020/0049088 A1 Feb. 13, 2020

(30) Foreign Application Priority Data
Aug. 7, 2018 (JP) .................................. 2018-148075

(51) Int. Cl.
*F02D 41/02* (2006.01)
*F01N 3/20* (2006.01)
(Continued)

(52) U.S. Cl.
CPC ..... *F02D 41/0295* (2013.01); *B01D 53/9454* (2013.01); *B01D 53/9495* (2013.01); *F01N 3/0253* (2013.01); *F01N 3/035* (2013.01); *F01N 3/20* (2013.01); *F01N 11/007* (2013.01); *F02D 17/02* (2013.01); *F02D 41/025* (2013.01);
(Continued)

(58) Field of Classification Search
CPC ............ B01D 53/9445; B01D 53/9454; B01D 53/9495; B60K 6/24; B60K 6/48; B60Y 2200/92; F01N 11/007; F01N 2430/08; F01N 2590/11; F01N 2900/08; F01N 2900/1624; F01N 3/0253; F01N 3/035; F01N 3/101; F01N 3/20; F01N 3/22; F01N 9/00; F02D 17/02; F02D 2200/04; F02D 2200/0814; F02D 41/025; F02D 41/029; F02D 41/0295; F02D 41/32; F02P 5/045; F02P 5/15; F02P 5/1504
See application file for complete search history.

(56) References Cited

U.S. PATENT DOCUMENTS 6,226,982 B1 * 5/2001 Poggio ................ F02D 41/0295
60/274
6,371,074 B1 * 4/2002 Keller .................... F02D 41/042
123/198 DB

(Continued)

*Primary Examiner* — Jesse S Bogue
(74) *Attorney, Agent, or Firm* — Oliff PLC (57) ABSTRACT

When stopping combustion in a cylinder under a situation in which the crankshaft of an internal combustion engine having an ignition device is rotating, a controller executes a fuel introduction process of injecting fuel from a fuel injection valve and introducing the fuel from inside the cylinder to the exhaust passage without burning the fuel. Also, the controller executes a storing process before starting the fuel introduction process. In the storing process, the controller stores oxygen in a three-way catalyst by executing a fuel cutoff process of stopping fuel injection of the fuel injection valve under a situation in which the crankshaft is rotating.

7 Claims, 5 Drawing Sheets (51) Int. Cl.
  *B01D 53/94* (2006.01)
  *F01N 11/00* (2006.01)
  *F02P 5/15* (2006.01)
  *F02D 41/32* (2006.01)
  *F02P 5/04* (2006.01)
  *F01N 3/025* (2006.01)
  *F01N 3/035* (2006.01)
  *F02D 17/02* (2006.01)
  *B60K 6/24* (2007.10)

(52) U.S. Cl.
  CPC ........... *F02D 41/029* (2013.01); *F02D 41/32* (2013.01); *F02P 5/045* (2013.01); *F02P 5/15* (2013.01); *B60K 6/24* (2013.01); *B60Y 2200/92* (2013.01); *F02D 2200/04* (2013.01); *F02D 2200/0814* (2013.01)

(56) References Cited

U.S. PATENT DOCUMENTS

| | | | |
|---|---|---|---|
| 2008/0276602 A1 | 11/2008 | McCabe et al. | |
| 2009/0193796 A1* | 8/2009 | Wei | F01N 13/0097 60/297 |
| 2013/0061573 A1* | 3/2013 | In | F02D 41/0087 60/274 |
| 2013/0091828 A1* | 4/2013 | In | F02P 9/002 60/274 |
| 2014/0041362 A1* | 2/2014 | Ulrey | F02D 41/0087 60/274 |
| 2018/0355774 A1 | 12/2018 | Sudschajew | |

\* cited by examiner

CONTROLLER AND CONTROL METHOD FOR INTERNAL COMBUSTION ENGINE

BACKGROUND

1. Field

The present disclosure relates to a controller and a control method for an internal combustion engine.

2. Description of Related Art

US Patent Application Publication No. 2014/41362 discloses a spark-ignition internal combustion engine. This internal combustion engine is equipped with a three-way catalyst and a filter that collects particulate matter. The three-way catalyst is arranged in the exhaust passage. The filter is located in the exhaust passage on the downstream side of the three-way catalyst.

In the internal combustion engine of US Patent Application Publication No. 2014/41362, the combustion in the cylinder may be stopped when the required torque decreases and the load decreases due to cancellation of the accelerator operation. In such a combustion stop period, one of a fuel cutoff process and a fuel introduction process is executed. The fuel cutoff process is configured to stop fuel injection of the fuel injection valve, and the fuel introduction process is configured to cause the fuel injected from the fuel injection valve to flow out to the exhaust passage from inside of the cylinder without being burned. According to US Patent Application Publication No. 2014/41362, the fuel introduction process is executed when the filter is being regenerated, and the fuel cutoff process is executed when the filter is not regenerated.

In the fuel introduction process, the fuel injected from the fuel injection valve flows through the exhaust passage together with air. When the fuel is introduced into the three-way catalyst, combustion of the fuel increases the temperature of the three-way catalyst. As the temperature of the three-way catalyst increases, high temperature gas flows into the filter to increase the temperature of the filter. This burns particulate matter trapped by the filter.

When fuel is supplied to the three-way catalyst and burned by the execution of the fuel introduction process, oxygen stored in the three-way catalyst is consumed. If the oxygen storage amount of the three-way catalyst is relatively small before starting the fuel introduction process, the oxygen storage amount of the three-way catalyst may be insufficient when fuel is burned in the three-way catalyst during the fuel introduction process. In this case, fuel may pass through the three-way catalyst without being burned. Also, the temperature increase of the three-way catalyst may be insufficient even if the fuel introduction process is executed.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In a first general aspect, a controller for an internal combustion engine is provided. The internal combustion engine includes a fuel injection valve, which injects fuel, an ignition device, which performs spark discharge in a cylinder, and a three-way catalyst provided in an exhaust passage. The internal combustion engine is configured to ignite air-fuel mixture containing fuel injected from the fuel injection valve by spark discharge of the ignition device to burn the air-fuel mixture in the cylinder. The controller is configured to: when stopping combustion in the cylinder under a situation in which a crankshaft of the internal combustion engine is rotating, select and execute one of a fuel cutoff process of stopping fuel injection of the fuel injection valve and a fuel introduction process of injecting fuel from the fuel injection valve and introducing the fuel from inside the cylinder to the exhaust passage without burning the fuel; and execute a storing process of executing the fuel cutoff process to store oxygen in the three-way catalyst before starting the fuel introduction process.

In a second general aspect, a controller for an internal combustion engine is provided. The internal combustion engine includes a fuel injection valve, which injects fuel, an ignition device, which performs spark discharge in a cylinder, and a three-way catalyst provided in an exhaust passage. The internal combustion engine is configured to ignite air-fuel mixture containing fuel injected from the fuel injection valve by spark discharge of the ignition device to burn the air-fuel mixture in the cylinder. The controller includes circuitry that is configured to: when stopping combustion in the cylinder under a situation in which a crankshaft of the internal combustion engine is rotating, select and execute one of a fuel cutoff process of stopping fuel injection of the fuel injection valve and a fuel introduction process of injecting fuel from the fuel injection valve and introducing the fuel from inside the cylinder to the exhaust passage without burning the fuel; and execute a storing process of executing the fuel cutoff process to store oxygen in the three-way catalyst before starting the fuel introduction process.

In a third general aspect, a control method for an internal combustion engine is provided. The internal combustion engine includes a fuel injection valve, which injects fuel, an ignition device, which performs spark discharge in a cylinder, and a three-way catalyst provided in an exhaust passage. The internal combustion engine is configured to ignite air-fuel mixture containing fuel injected from the fuel injection valve by spark discharge of the ignition device to burn the air-fuel mixture in the cylinder. The control method includes: when stopping combustion in the cylinder under a situation in which a crankshaft of the internal combustion engine is rotating, selecting and executing one of a fuel cutoff process of stopping fuel injection of the fuel injection valve and a fuel introduction process of injecting fuel from the fuel injection valve and introducing the fuel from inside the cylinder to the exhaust passage without burning the fuel; and executing a storing process of executing the fuel cutoff process to store oxygen in the three-way catalyst before starting the fuel introduction process.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

First Embodiment

A controller 100 for an internal combustion engine 10 according to a first embodiment will now be described with reference to FIGS. 1 to 4.

Figure 1:
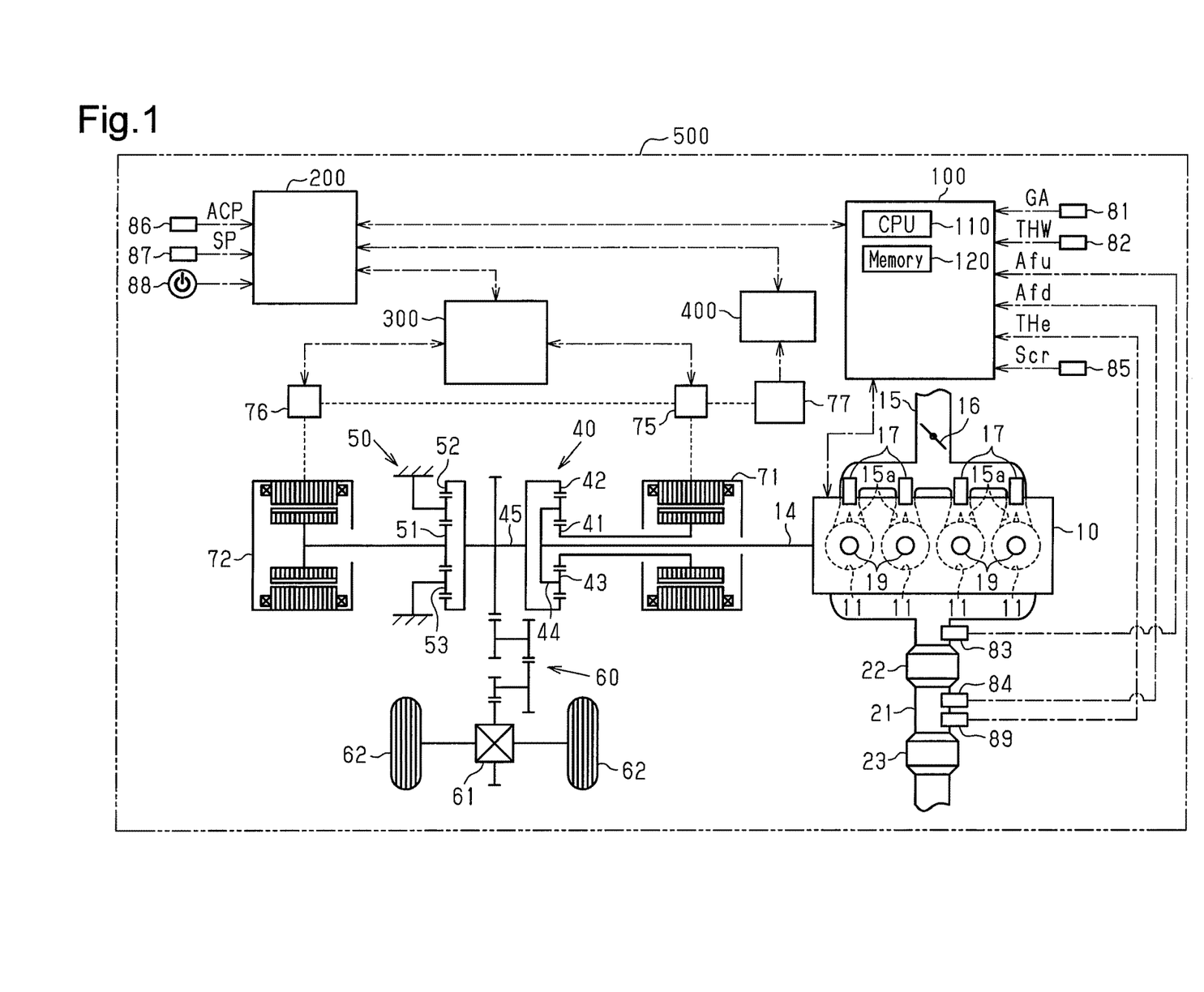
FIG. 1 is a schematic diagram showing the configuration of a hybrid vehicle equipped with a controller for an internal combustion engine according to a first embodiment of the present disclosure.

As shown in FIG. 1, a hybrid vehicle 500 (hereinafter, referred to simply as the vehicle 500) includes the internal combustion engine 10, a driving force distribution-integration mechanism 40, and a first motor generator 71. The driving force distribution-integration mechanism 40 is connected to a crankshaft 14 of the internal combustion engine 10. The first motor generator 71 is connected to the driving force distribution-integration mechanism 40. The driving force distribution-integration mechanism 40 is connected to a second motor generator 72 via a reduction gear 50. The driving force distribution-integration mechanism 40 is connected to driven wheels 62 via a speed reduction mechanism 60, and the differential 61.

The driving force distribution-integration mechanism 40 is a planetary gear mechanism and includes a sun gear 41, which is an external gear, and a ring gear 42, which is an internal gear. Pinion gears 43 meshing with the sun gear 41 and the ring gear 42 are provided between the sun gear 41 and the ring gear 42. The pinion gears 43 are rotationally supported by a carrier 44. The pinion gears 43 are also allowed to orbit about the sun gear 41. The sun gear 41 is coupled to the first motor generator 71. The carrier 44 is coupled to the crankshaft 14. The ring gear 42 is connected to a ring gear shaft 45. The ring gear shaft 45 is coupled to both the reduction gear 50 and the speed reduction mechanism 60.

The reduction gear 50 is a planetary gear mechanism and includes a sun gear 51, which is an external gear, and a ring gear 52, which is an internal gear. The sun gear 51 is coupled to the second motor generator 72. The ring gear 52 is connected to the ring gear shaft 45. Pinion gears 53 meshing with the sun gear 51 and the ring gear 52 are provided between the sun gear 51 and the ring gear 52. The pinion gears 53 are rotationally supported, while being unable to orbit about the sun gear 51.

The first motor generator 71 exchanges electric power with a battery 77 through a first inverter 75. The second motor generator 72 exchanges electric power with the battery 77 through a second inverter 76.

The output torque of the internal combustion engine 10 is distributed to the sun gear 41 and the ring gear 42 when input to the carrier 44 of the driving force distribution-integration mechanism 40. When the first motor generator 71 is rotated by the output torque distributed to the sun gear 41, the first motor generator 71 performs as a generator.

In contrast, when the first motor generator 71 is caused to perform as an electric motor, the output torque of the first motor generator 71 is input to the sun gear 41. The output torque of the first motor generator 71 input to the sun gear 41 is distributed to the carrier 44 and the ring gear 42. Then, the output torque of the first motor generator 71 is input to the crankshaft 14 through the carrier 44, so that the crankshaft 14 is rotated. This process, in which the first motor generator 71 performs as an electric motor to rotate the crankshaft 14, is referred to as "motoring."

The output torque of the internal combustion engine 10 distributed to the ring gear 42 and the output torque of the first motor generator 71 are input to the driven wheels 62 through the ring gear shaft 45, the speed reduction mechanism 60, and the differential 61.

Also, by causing the second motor generator 72 to perform as a generator when the vehicle 500 decelerates, regenerative braking force is generated in the vehicle 500 in accordance with the amount of power generated by the second motor generator 72. In contrast, when the second motor generator 72 performs as an electric motor, the output torque of the second motor generator 72 is input to the driven wheels 62 via the reduction gear 50, the ring gear shaft 45, the speed reduction mechanism 60, and the differential 61.

The internal combustion engine 10 has multiple cylinders 11. Each cylinder 11 accommodates a piston that reciprocates. Each piston is coupled to the crankshaft 14 via a connecting rod.

The internal combustion engine 10 includes an intake passage 15 and a throttle valve 16, which is provided in the intake passage 15 to regulate the flow rate of intake air flowing through the intake passage 15. The internal combustion engine 10 also includes fuel injection valves 17 and ignition devices 19 in correspondence with the respective cylinders. Each injection valve 17 injects fuel to an intake port 15a, and each ignition device 19 ignites air-fuel mixture of fuel and intake by spark discharge. Exhaust gas generated by combustion of air-fuel mixture in each cylinder 11 is discharged to an exhaust passage 21. A three-way catalyst 22 is provided in the exhaust passage 21. A filter 23 for trapping particulate matter in exhaust gas is provided in the exhaust passage 21 downstream of the three-way catalyst 22.

In the internal combustion engine 10, combustion of air-fuel mixture in the cylinders 11 may be stopped while the vehicle 500 is traveling and the crankshaft 14 is rotating. The period during which the combustion of air-fuel mixture in the cylinders 11 is stopped while the crankshaft 14 is rotating will hereafter be referred to as a "combustion stop period." In the combustion stop period, the piston in each cylinder 11 reciprocates in synchronization with rotation of the crankshaft 14. Therefore, the air introduced into each cylinder 11 via the intake passage 15 is discharged to the exhaust passage 21 without being burned.

In the above-described combustion stop period, one of a fuel cutoff process and a fuel introduction process is executed. The fuel cutoff process is configured to stop fuel injection of the fuel injection valves 17, and the fuel introduction process is configured to cause each fuel injection valve 17 to inject fuel and deliver the fuel to the exhaust passage 21 from inside of each cylinder 11 without burning the fuel.

When the fuel introduction process is executed, the fuel injected from each fuel injection valve 17 flows through the exhaust passage 21 with air and is then introduced into the three-way catalyst 22. At this time, if the temperature of the three-way catalyst 22 is higher than or equal to the activation temperature, and a sufficient amount of oxygen is present in the three-way catalyst 22 to burn the fuel, the fuel is burned in the three-way catalyst 22. When the fuel is burned in the three-way catalyst 22, the temperature of the three-way catalyst 22 increases, so that high temperature gas flows into the filter 23. This increases the temperature of the filter 23. Then, when the temperature of the filter 23 becomes higher than or equal to the ignition point of the particulate matter while oxygen is being supplied to the filter 23, the particulate matter collected in the filter 23 is burned. The filter 23 is thus regenerated.

The vehicle 500 has the engine controller 100, a motor controller 300, and a vehicle controller 200. The engine controller 100 executes various types of control of the internal combustion engine 10. The motor controller 300 performs various types of control of the first motor generator 71 and the second motor generator 72. The vehicle controller 200 controls the engine controller 100 and the motor controller 300 in a centralized manner. Also, the vehicle 500 is equipped with a battery monitoring device 400, which monitors the state of charge (SOC) of the battery 77.

The battery monitoring device 400 is connected to the battery 77. The battery monitoring device 400 has a central processing unit (CPU) and a memory. The battery monitoring device 400 receives the current 1B, the voltage VB, and the temperature TB of the battery 77. The battery monitoring device 400 calculates the state of charge SOC of the battery 77 by causing the CPU to execute programs stored in the memory based on the current 1B, the voltage VB and the temperature TB.

The motor controller 300 is connected to the first inverter 75 and the second inverter 76. The motor controller 300 has a central processing unit (CPU) and a memory. The motor controller 300 causes the CPU to execute programs stored in the memory to control the amount of power supplied from the battery 77 to the first motor generator 71 and the second motor generator 72 and the amount of power supplied to the battery 77 from the first motor generator 71 and the second motor generator 72 (that is, charging amount).

The engine controller 100, the motor controller 300, and the battery monitoring device 400 are connected to the vehicle controller 200 via communication ports. The vehicle controller 200 also has a central processing unit (CPU) and a memory. The vehicle controller 200 executes various types of control by causing the CPU to execute programs stored in the memory.

The vehicle controller 200 receives the state of charge SOC of the battery 77 from the battery monitoring device 400. The vehicle controller 200 is connected to an accelerator pedal sensor 86, which detects the depression amount of the accelerator pedal by the driver (accelerator operation amount ACC), a vehicle speed sensor 87, which detects the vehicle speed SP, which is the traveling speed of the vehicle 500, and a power switch 88. The vehicle controller 200 receives output signals from sensors and switches. The power switch 88 is a switch for activating the system of the hybrid vehicle 500. When the vehicle driver turns on the power switch 88, the vehicle 500 is in a drivable state.

The vehicle controller 200 calculates the required power of the vehicle, which is the required value of the driving force of the vehicle 500, based on the accelerator operation amount ACP and the vehicle speed SP. In addition, the vehicle controller 200 calculates the engine required torque, the first motor required torque, and the second motor required torque based on the vehicle required power, the state of charge SOC, and the like. The engine required torque is a required value of the output torque of the internal combustion engine 10. The first motor required torque is a required value of the driving torque or regenerative torque of the first motor generator 71. The second motor required torque is a required value of the driving torque or regenerative torque of the second motor generator 72. The engine controller 100 controls the power of the internal combustion engine 10 in accordance with the engine required torque. The motor controller 300 executes a torque control necessary to drive the vehicle 500 by executing a torque control of the first motor generator 71 and the second motor generator 72 in accordance with the first motor required torque and the second motor required torque.

The engine controller 100 includes a central processing unit (hereinafter, referred to as a CPU) 110 and a memory 120, which stores programs and data that are used in control. The CPU 110 executes programs stored in the memory 120 to execute various types of engine control.

The engine controller 100 is connected to an air flowmeter 81, a coolant temperature sensor 82, and a crank angle sensor 85. The air flowmeter 81 is an intake air amount sensor that detects an intake air amount GA. The coolant temperature sensor 82 detects a coolant temperature THW, which is the temperature of the coolant of the internal combustion engine 10. The crank angle sensor 85 detects the rotational angle of the crankshaft 14. The engine controller 100 receives output signals from the above-described sensors. The engine controller 100 is also connected to a first air-fuel ratio sensor 83 and a second air-fuel ratio sensor 84. The engine controller 100 also receives output signals from these sensors. The first air-fuel ratio sensor 83 is provided in the exhaust passage 21 on the upstream side of the three-way catalyst 22 and outputs a signal that corresponds to the oxygen concentration of the exhaust gas. The second air-fuel ratio sensor 84 is provided in the exhaust passage 21 between the three-way catalyst 22 and the filter 23 and outputs a signal that corresponds to the oxygen concentration of the exhaust gas. The signal output from the first air-fuel ratio sensor 83 allows an upstream-side air-fuel ratio Afu, which is the air-fuel ratio of the exhaust gas on the upstream side of the three-way catalyst 22, to be detected. Also, the signal output from the second air-fuel ratio sensor 84 allows a downstream-side air-fuel ratio Afd, which is the air-fuel ratio of the exhaust gas on the downstream side of the three-way catalyst 22, to be detected. The engine controller 100 is also connected to a temperature sensor 89. The engine controller 100 also receives an output signal from the temperature sensor 89. The temperature sensor 89 is provided in the exhaust passage 21 between the three-way catalyst 22 and the filter 23 and detects a catalyst exit gas temperature THe, which is the temperature of the exhaust gas after passing the three-way catalyst 22.

The engine controller 100 calculates an engine rotational speed NE based on an output signal Scr of the crank angle sensor 85. In addition, the engine controller 100 calculates an engine load factor KL based on the engine rotational speed NE and the intake air amount GA. The engine load factor KL is the ratio of the current cylinder inflow air amount to the cylinder inflow air amount when the internal combustion engine 10 is in a steady operation state with the throttle valve 16 fully open at the current engine rotational speed NE. The cylinder inflow air amount is the amount of air that flows into each cylinder 11 in the intake stroke.

The engine controller 100 calculates a catalyst temperature Tsc, which is the temperature of the three-way catalyst 22, and a filter temperature Tf, which is the temperature of the filter 23, based on the catalyst exit gas temperature THe and various types of engine operating states such as the intake charging efficiency and the engine rotational speed NE. Also, the engine controller 100 calculates a PM deposition amount Ps based on the engine rotational speed NE, the engine load factor KL, the filter temperature Tf, and the like. The PM deposition amount Ps is the amount of particulate matter deposited on the filter 23.

The engine controller 100 determines whether a combustion stop condition of the air-fuel mixture in the cylinders 11 is satisfied. When, for example, the engine required torque is greater than 0, the engine controller 100 determines that the combustion stop condition is not satisfied, and burns air-fuel mixture in the cylinders 11. When burning air-fuel mixture in the cylinders 11, the engine controller 100 calculates a required value QPR of the fuel injection amount such that the upstream-side air-fuel ratio Afu becomes the target air-fuel ratio Aft. The target air-fuel ratio AFT for burning air-fuel mixture in the cylinders 11 is set to, for example, the stoichiometric air-fuel ratio or a value close to the stoichiometric air-fuel ratio. Then, the engine controller 100 controls the operation of the fuel injection valves 17 based on the calculated request value QPR. In addition, the engine controller 100 controls the ignition timing of air-fuel mixture such that spark discharge of the ignition devices 19 is performed when the piston in each cylinder 11 reaches a point near the compression top dead center. The combustion of air-fuel mixture in the cylinders 11 is carried out through the above-described fuel injection control and ignition timing control.

In contrast, when the engine required torque is less than or equal to 0, the engine controller 100 determines that the combustion stop condition is satisfied. If it is determined that the combustion stop condition is satisfied, the engine controller 100 determines whether the execution condition of the fuel introduction process is satisfied, thereby selecting and executing one of the fuel cutoff process and the fuel introduction process when stopping combustion of air-fuel mixture in the cylinder 11. If both of the following conditions (A) and (B) are satisfied, the engine controller 100 determines that the execution condition of the fuel introduction process is satisfied.

Condition (A): the catalyst temperature Tsc, which is the temperature of the three-way catalyst 22, is higher than or equal to a specified temperature. This condition is set for the following reason. Even if unburned fuel is introduced into the three-way catalyst 22, a low temperature of the three-way catalyst 22 may not allow the fuel to be burned. Therefore, the above-described specified temperature is set in advance as a criterion to determine whether the unburned fuel introduced to the three-way catalyst 22 can be burned. The specified temperature is set to the activation temperature of the three-way catalyst 22 or a temperature slightly higher than the activation temperature.

Condition (B): the PM deposition amount Ps of the filter 23 is greater than or equal to a specified amount. This condition is set for the following reason. As the deposition amount of particulate matter trapped by the filter 23 increases, the clogging of the filter 23 progresses. Therefore, the above-described specified amount is set in advance as a criterion for determining whether the clogging has progressed to such an extent that the filter 23 needs to be regenerated.

When determining that the execution condition of the fuel introduction process is not satisfied, the engine controller 100 executes the above-described fuel cutoff process by stopping both the fuel injection of the fuel injection valves 17 and the spark discharge of the ignition devices 19.

When determining that the execution condition of the fuel introduction process is satisfied, the engine controller 100 executes the above-described fuel introduction process. When executing the fuel introduction process, the engine controller 100 sets a fuel injection amount required value QPD for the fuel introduction process to a value that is less than the fuel injection amount required value QPR set when burning air-fuel mixture in the cylinders 11 and greater than 0. Then, the engine controller 100 controls the operation of the fuel injection valves 17 based on the set required value QPD. Therefore, when the fuel injected from the fuel injection valve 17 is introduced into the cylinder 11 based on the required value QPD, the air-fuel ratio in the cylinder 11 has a value that is leaner than the air-fuel ratio when burning air-fuel mixture in cylinder 11. Then, while executing the fuel introduction process, the engine controller 100 stops the spark discharge of the ignition devices 19 and requests the vehicle controller 200 to execute the motoring. When execution of the motoring is requested, the vehicle controller 200 requests the motor controller 300 to drive the first motor generator 71. The motor controller 300 controls the operation of the first motor generator 71 to perform the motoring. When the crankshaft 14 is rotated by the motoring, intake and exhaust are performed in each cylinder 11. Thus, during the execution of the fuel introduction process, fuel is injected from the fuel injection valves 17 and the spark discharge of the ignition devices 19 is stopped while crankshaft 14 is rotating. Therefore, the fuel injected from the fuel injection valves 17 is discharged to the exhaust passage 21 together with air without being burned in the cylinders 11.

Before starting the fuel introduction process, the engine controller 100 executes a storing process to store oxygen in the three-way catalyst 22 until the oxygen storage amount of the three-way catalyst 22 reaches the maximum oxygen storage amount. The maximum oxygen storage amount is the maximum value of oxygen that can be stored in the three-way catalyst 22.

Figure 2:
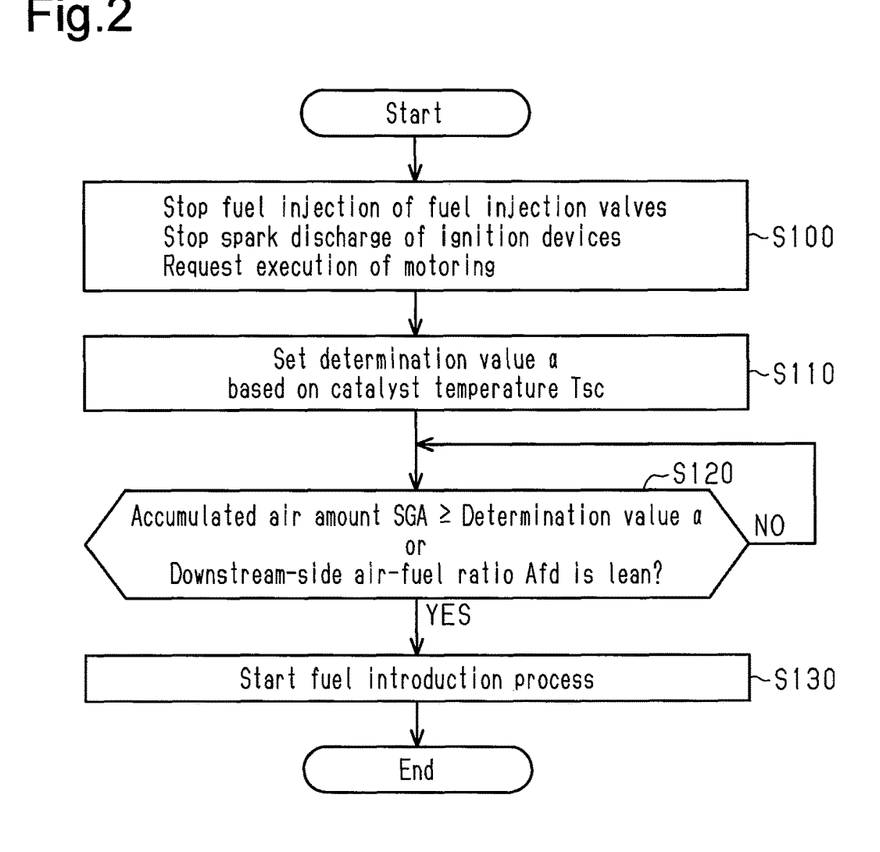
FIG. 2 is a flowchart showing the procedure for executing a storing process in the first embodiment.

FIG. 2 shows the flow of the storing process from the start to the end. The series of processes shown in FIG. 2 starts when the execution condition of the fuel introduction process is satisfied. The CPU 110 executes a program stored in the memory 120 of the engine controller 100 to execute the series of processes shown in FIG. 2. In the following description, the number of each step is represented by the letter S followed by a numeral.

When starting the storing process, the CPU 110 first starts the fuel cutoff process by stopping both the fuel injection of the fuel injection valves 17 and the spark discharge of the ignition devices 19. The CPU 110 also requests the execution of the motoring to start the motoring. That is, the CPU 110 starts the fuel cutoff process under the situation in which the crankshaft 14 is rotating (S100).

Next, in S100, the CPU 110 obtains the catalyst temperature Tsc of the three-way catalyst 22 at the start of the fuel cutoff process. Then, the CPU 110 sets a determination value α based on the obtained catalyst temperature Tsc (S110). The determination value α will now be described.

After the fuel cutoff process is started in S100, the oxygen storage amount of the three-way catalyst 22 increases as an accumulated air amount SGA increases, which is the value obtained by accumulating the intake air amount GA detected by the air flowmeter 81. When the accumulated air amount SGA reaches a certain value, the oxygen storage amount of the three-way catalyst 22 reaches the maximum oxygen storage amount. In the first embodiment, when the fuel cutoff process is started in S100, the CPU 110 starts the calculation of the accumulated air amount SGA.

Then, when the accumulated air amount SGA becomes greater than or equal to the specified determination value α, the CPU 110 determines that the oxygen storage amount of the three-way catalyst 22 has reached the maximum oxygen storage amount. The accumulated air amount SGA required for the oxygen storage amount of the three-way catalyst 22 to reach the maximum oxygen storage amount is previously obtained as the determination value α. In the present embodiment, it is assumed that the initial value of the amount of oxygen stored by the three-way catalyst 22 is 0, and the determination value α is set to the accumulated air amount SGA required to reach the maximum oxygen storage amount from the state in which the oxygen storage amount is 0. Alternatively, the initial value of the amount of oxygen stored by the three-way catalyst 22 may be a value other than 0.

Figure 3:
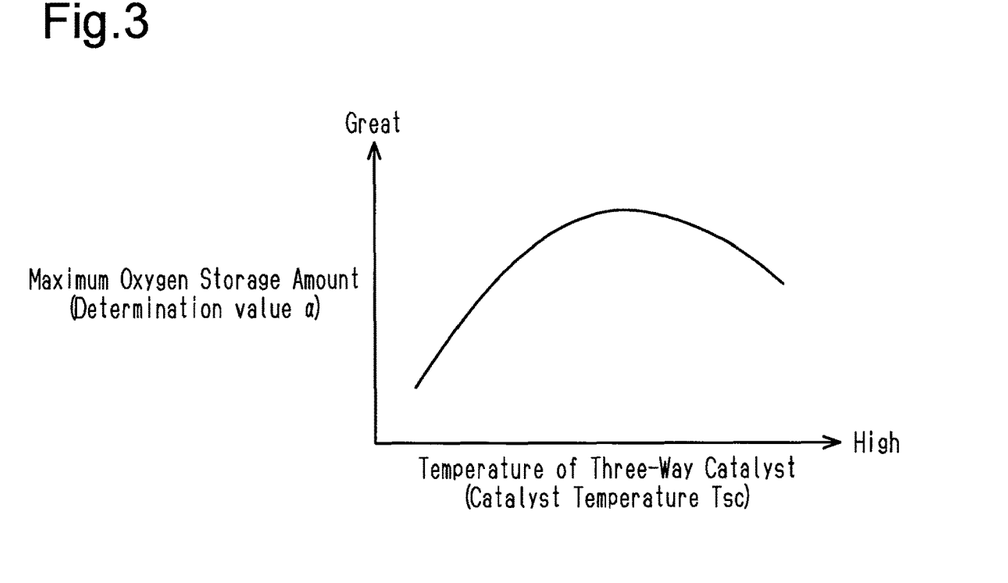
FIG. 3 is a graph showing the relationship between the temperature of the three-way catalyst and the maximum oxygen storage amount.

As shown in FIG. 3, the maximum oxygen storage amount of the three-way catalyst 22 changes in accordance with the temperature of the three-way catalyst 22. Specifically, as the temperature of the three-way catalyst 22 increases, the maximum oxygen storage amount also increases. After the temperature of the three-way catalyst 22 reaches a predetermined temperature, the maximum oxygen storage amount decreases as the temperature of the three-way catalyst 22 increases. The CPU 110 refers to a preset map to variably set the determination value α based on the catalyst temperature Tsc of the three-way catalyst 22 such that the determination value α follows changes in the maximum oxygen storage amount in accordance with the temperature of the three-way catalyst 22.

Next, the CPU 110 executes the process of S120 to determine whether the oxygen storage amount of the three-way catalyst 22 has reached the maximum oxygen storage amount. In S120, the CPU 110 determines whether the current accumulated air amount SGA is greater than or equal to the determination value α, or whether the current downstream-side air-fuel ratio Afd is leaner than the stoichiometric air-fuel ratio. The reason for determining whether the downstream-side air-fuel ratio Afd is leaner than the stoichiometric air-fuel ratio in S120 is as follows.

If the fuel cutoff process is performed without the oxygen storage amount of the three-way catalyst 22 having reached the maximum oxygen storage amount, the three-way catalyst 22 takes oxygen from the gas flowing into the three-way catalyst 22 and stores the oxygen. The gas after passing through the three-way catalyst 22 thus does not contain oxygen. Therefore, in the process of increasing the oxygen storage amount in the three-way catalyst 22, the downstream-side air-fuel ratio Afd detected by the second air-fuel ratio sensor 84 becomes a value close to the stoichiometric air-fuel ratio. When the oxygen storage amount of the three-way catalyst 22 reaches the maximum oxygen storage amount, the oxygen storage in the three-way catalyst 22 is stopped, so that the gas flowing into the three-way catalyst 22 starts passing through the three-way catalyst 22 while retaining oxygen. Therefore, when the oxygen storage amount of the three-way catalyst 22 has reached the maximum oxygen storage amount, the downstream-side air-fuel ratio Afd detected by the second air-fuel ratio sensor 84 becomes leaner than the stoichiometric air-fuel ratio. Thus, when the detection value of the second air-fuel ratio sensor 84 indicates a lean air-fuel ratio, it is determined that the oxygen storage amount of the three-way catalyst 22 has reached the maximum oxygen storage amount. Therefore, in the first embodiment, even when the downstream-side air-fuel ratio Afd becomes leaner than the stoichiometric air-fuel ratio during the execution of the fuel cutoff process started in the process of S100, the CPU 110 determines that the oxygen storage amount of the three-way catalyst 22 has reached the maximum oxygen storage amount. When the downstream-side air-fuel ratio Afd becomes leaner than the stoichiometric air-fuel ratio by a predetermined value, the CPU 110 determines that the downstream-side air-fuel ratio Afd is leaner than the stoichiometric air-fuel ratio. Alternatively, if the downstream-side air-fuel ratio Afd is maintained at a value leaner than the stoichiometric air-fuel ratio for a certain period of time, the CPU 110 may determine that the downstream-side air-fuel ratio Afd has become leaner than the stoichiometric air-fuel ratio.

The value of the downstream-side air-fuel ratio Afd reflects the actual oxygen storage state of the three-way catalyst 22. Therefore, whether the oxygen storage amount of the three-way catalyst 22 has reached the maximum oxygen storage amount is more accurately determined by using the downstream-side air-fuel ratio Afd as a basis than by comparing the accumulated air amount SGA with the determination value α. However, during cold start of the engine, the time required for the second air-fuel ratio sensor 84 to be able to output a signal is extended. Accordingly, it takes a certain time for the determination based on the downstream-side air-fuel ratio Afd can be started. In contrast, comparison between the accumulated air amount SGA and the determination value α can be made promptly even at cold start of the engine. For this reason, in the first embodiment, the determination based on the downstream-side air-fuel ratio Afd is used in combination with the comparison between the accumulated air amount SGA and the determination value α to determine whether the oxygen storage amount of the three-way catalyst 22 has reaches the maximum oxygen storage amount.

The CPU 110 repeatedly executes the process of S120 until determining that the current accumulated air amount SGA is greater than or equal to the determination value α, or until determining that the current downstream-side air-fuel ratio Afd is leaner than the stoichiometric air-fuel ratio.

The CPU 100 stops the fuel cutoff process and starts the fuel introduction process (S130) when making an affirmative determination in S120 (S120: YES), that is, when determining that the current accumulated air amount SGA is greater than or equal to the determination value α, or when determining that the current downstream-side air-fuel ratio Afd is leaner than stoichiometric air-fuel ratio. Then, the CPU 110 ends the current storing process. When the fuel introduction process started by the process of S130 ends, the CPU 110 ends the calculation of the accumulated air amount SGA and resets the value to 0.

Figure 4:
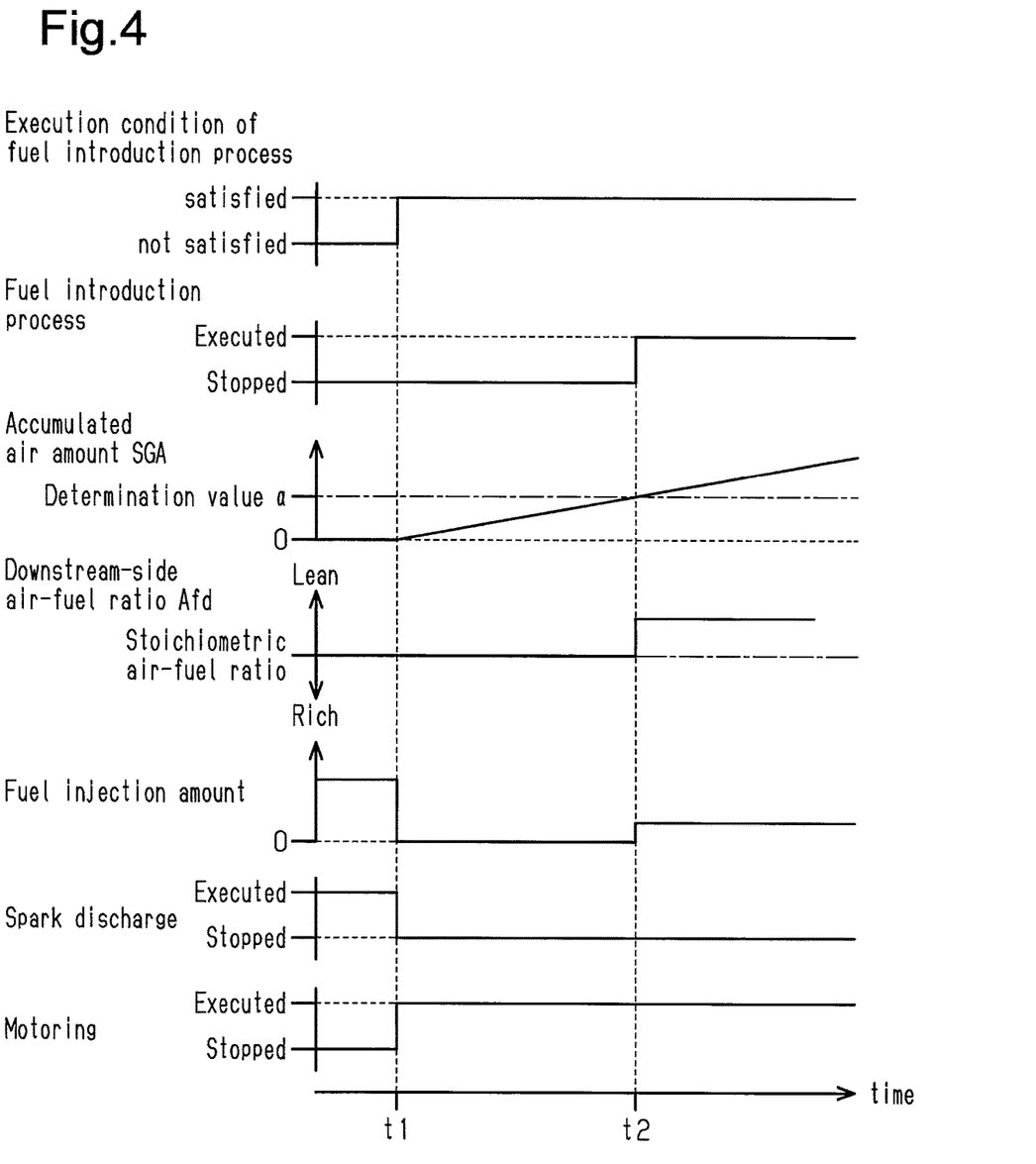
FIG. 4 is a timing diagram showing the operation of the first embodiment.

FIG. 4 shows the starting time of the fuel introduction process when the storing process is executed. At a point in time t1, when the execution condition of the fuel introduction process is satisfied, both the fuel injection of the fuel injection valves 17 and the spark discharge of the ignition devices 19 are stopped, and the fuel cutoff process is started and the motoring is also started. When the fuel cutoff process is started, the oxygen storage amount of the three-way catalyst 22 increases. When the accumulated air amount SGA reaches the determination value α after gradually increasing, it is determined that the oxygen storage amount of the three-way catalyst 22 has reached the maximum oxygen storage amount. In the example shown in FIG. 4, the oxygen storage amount of the three-way catalyst 22 reaches the maximum oxygen storage amount at a point in time t2. Therefore, at the point in time t2, the downstream-side air-fuel ratio Afd changes from the value close to the stoichiometric air-fuel ratio to a value leaner than the stoichiometric air-fuel ratio. At the point in time t2, the stopping of spark discharge and the motoring are being continued. In contrast, at the point in time t2, fuel injection is started so that the fuel injection valves 17, which have been stopped from injecting fuel until the point in time t2, start injecting fuel of an amount corresponding to the required value QPD. Accordingly, the fuel cutoff process is cancelled, and the fuel introduction process is started.

The first embodiment achieves the following advantages.

(1) By executing the storing process before starting the fuel introduction process, the fuel cutoff process is executed in the situation where the crankshaft 14 is rotating. This supplies air to the three-way catalyst 22, so that the oxygen storage amount of the three-way catalyst 22 is increased. The fuel cutoff process, which is executed before the fuel introduction process is started, is continued until the oxygen storage amount of the three-way catalyst 22 reaches the maximum oxygen storage amount. Therefore, since the fuel introduction process is started when the oxygen storage amount of the three-way catalyst 22 has reached the maximum oxygen storage amount, the oxygen storage amount of the three-way catalyst 22 is unlikely to be insufficient during the fuel introduction process.

(2) The accumulated air amount SGA is the accumulated value of the intake air amount after the fuel injection of the fuel injection valves 17 and the spark discharge of the ignition devices 19 are both stopped due to the execution of the fuel cutoff process. It is determined that the oxygen storage amount of the three-way catalyst has reached the maximum oxygen storage amount when the accumulated air amount SGA has become greater than or equal to the determination value α. Therefore, in the storing process, it is possible to carry out the fuel cutoff process until the oxygen storage amount of the three-way catalyst 22 reaches the maximum oxygen storage amount.

(3) The determination value α is compared with the accumulated air amount SGA to determine whether the oxygen storage amount of the three-way catalyst has reached the maximum oxygen storage amount. The determination value α is set variably based on the catalyst temperature Tsc, which is the temperature of the three-way catalyst 22. Therefore, even if the temperature of the three-way catalyst 22 is different, the storing process reliably determines whether the oxygen storage amount of the three-way catalyst 22 has reached the maximum oxygen storage amount.

(4) The oxygen storage amount of the three-way catalyst 22 is determined to have reached the maximum oxygen storage amount when the downstream-side air-fuel ratio Afd becomes leaner than the stoichiometric air-fuel ratio during the fuel cutoff process. Therefore, in the storing process, it is also possible to carry out the fuel cutoff process until the oxygen storage amount of the three-way catalyst 22 reaches the maximum oxygen storage amount.

Second Embodiment

A controller 100 for an internal combustion engine 10 according to a second embodiment will now be described with reference to FIGS. 5 and 6.

The internal combustion engine 10 has fuel injection valves 17 that inject fuel into intake ports 15*a*. Some of the fuel injected from the fuel injection valves 17 collects on the wall surfaces of the intake ports 15*a*. When the fuel injection of fuel injection valves 17 and the spark discharge of the ignition devices 19 are both stopped by the execution of the fuel cutoff process with fuel collecting on the intake ports 15*a*, the fuel collecting on the intake ports 15*a* is drawn into the cylinders 11, and then discharged to the exhaust passage 21 without being burned in the cylinders 11. Thus, when the fuel collecting on the intake ports 15*a* is discharged to the exhaust passage 21, the fuel injected from fuel injection valves 17 and the fuel collecting on the intake port 15*a* are both supplied to the three-way catalyst 22 when the fuel introduction process is executed. For this reason, the three-way catalyst 22 is supplied with fuel in an amount greater than the amount of fuel injected from the fuel injection valves 17. If an excessive amount of fuel is supplied to the three-way catalyst 22 in this manner, some fuel may pass through the three-way catalyst 22 without being burned.

In this regard, the second embodiment executes an ignition stop delaying process when starting the fuel cutoff process in the storing process. The ignition stop delaying process stops the spark discharge of the ignition devices 19 after a predetermined delay period has elapsed since the fuel injection of the fuel injection valves 17 were stopped. In the second embodiment, in order to execute the ignition stop delaying process, the processes of S200 to S220 shown in FIG. 5 are executed instead of the process of S100 shown in FIG. 2. Also in this case, the CPU 110 executes the ignition stop delaying process composed of the processes of S200 to S220 by executing a program stored in the memory 120 of the engine controller 100.

Figure 5:
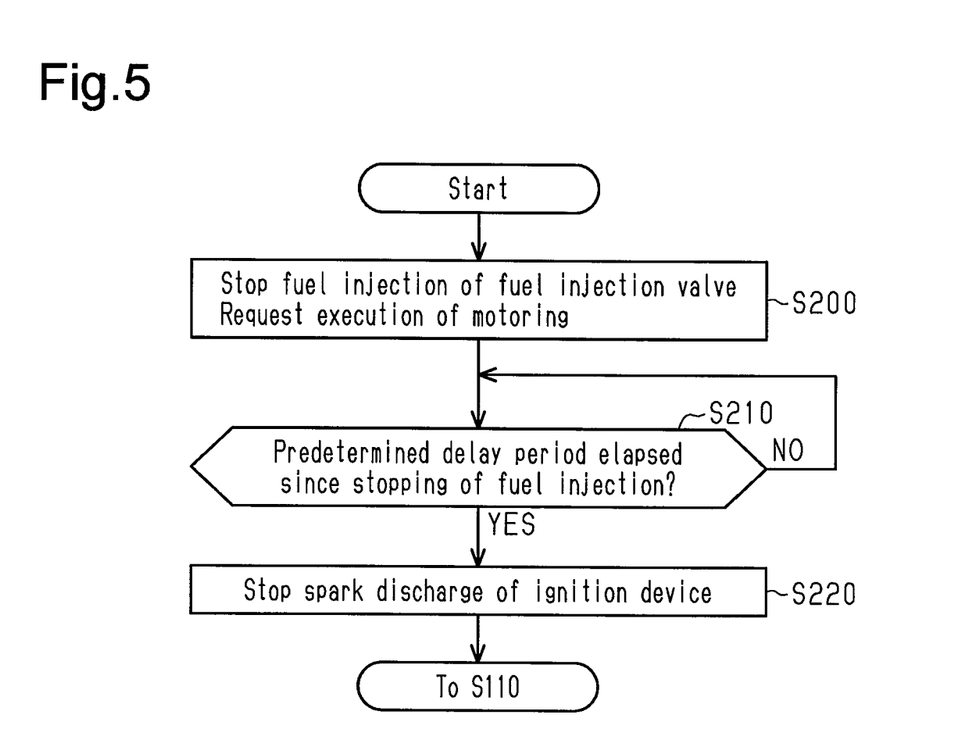
FIG. 5 is a flowchart showing the procedure for executing an ignition stop delaying process in a second embodiment of the present disclosure.

When starting the storing process of the second embodiment shown in FIG. 5, the CPU 110 first stops the fuel injection of the fuel injection valves 17 and requests the execution of the motoring to start the motoring (S200). Next, the CPU 110 determines whether a predetermined delay period has elapsed since the fuel injection of the fuel injection valves 17 was stopped (S210). The delay period is obtained in advance as a period necessary for burning the collected fuel at the intake ports 15*a* drawn into the cylinders 11. The delayed period is set to a period in which several cycles of the internal combustion engine 10 (intake stroke, compression stroke, expansion stroke, and exhaust stroke).

Then, the CPU 110 repeatedly executes the process of S210 until it is determined that the predetermined delay period has elapsed since the fuel injection of the fuel injection valves 17 was stopped. When making an affirmative determination in S210 (S210: YES), that is, when determining that the predetermined delay period has elapsed since fuel injection of the fuel injection valves 17 was stopped, the CPU 110 ends the ignition stop delaying process by stopping the spark discharge of the ignition devices 19 (S220). Then, the CPU 110 executes the processes after S110 shown in FIG. 2. In the second embodiment, by executing the process of S220, the fuel cutoff process is started in the process of S100 shown in FIG. 2. That is, the fuel cutoff process for stopping both the fuel injection of the fuel injection valves 17 and the spark discharge of the ignition devices 19 is started. Therefore, in the second embodiment, the calculation of the accumulated air amount SGA is started from the time when the processing of S220 is executed.

Figure 6:
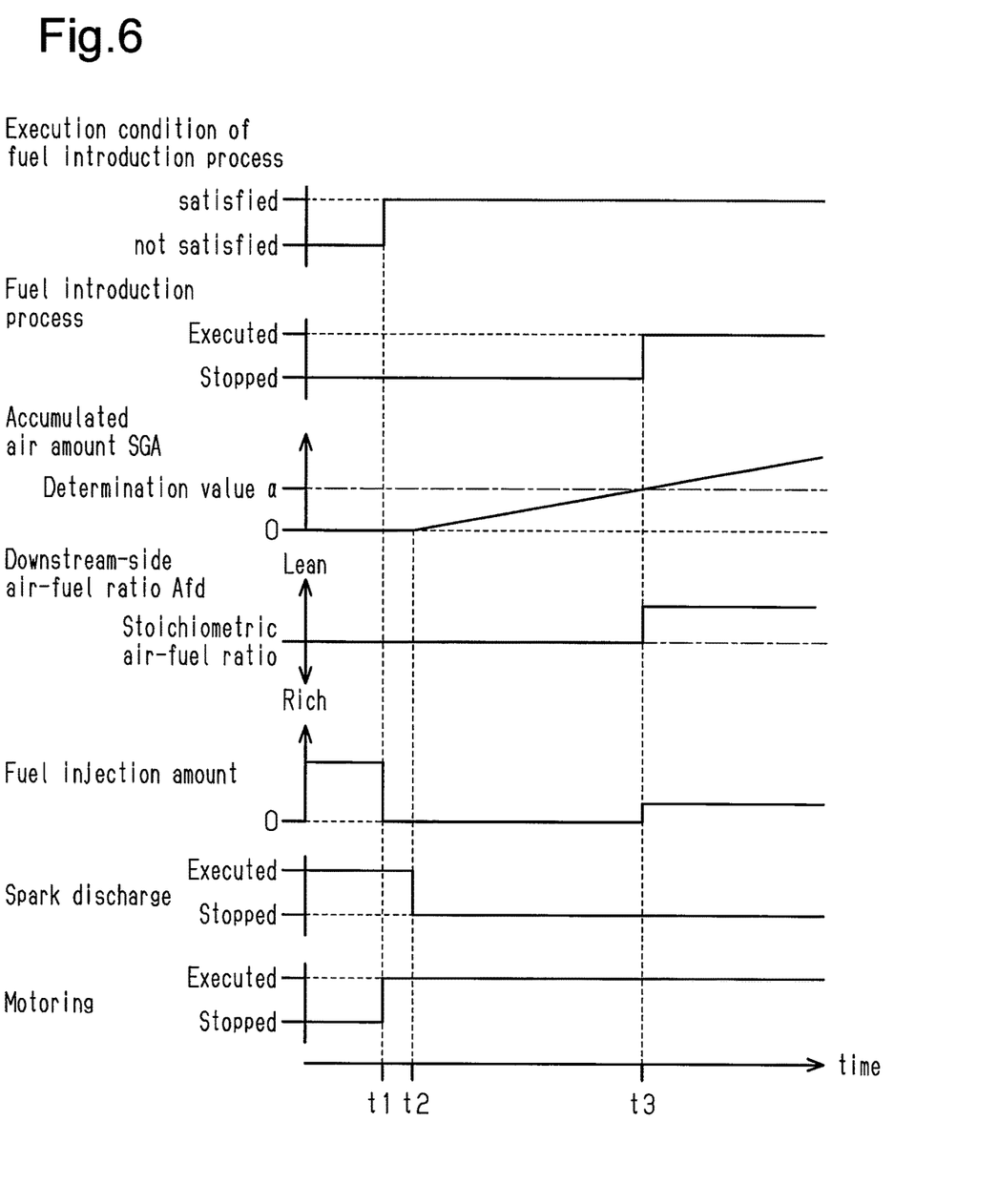
FIG. 6 is a timing diagram showing the operation of the second embodiment.

FIG. 6 shows the operation of the ignition stop delaying process.

When the execution condition of the fuel introduction process is satisfied at a point in time t1, the process of stopping the fuel injection of the fuel injection valves 17 is started first. Also, the motoring is started at the point in time t1. Then, when the delay period has elapsed after the fuel injection of the fuel injection valves 17 is stopped (point in time t2), the process of stopping the spark discharge of the ignition devices 19 is started. This starts the fuel cutoff process that stops both the fuel injection of the fuel injection valves 17 and the spark discharge of the ignition devices 19. When the accumulated air amount SGA reaches the determination value α after gradually increasing after the point in time t2, it is determined that the oxygen storage amount of the three-way catalyst 22 has reached the maximum oxygen storage amount (point in time t3). At the point in time t3, the stopping of spark discharge and the motoring are being continued. In contrast, at the point in time t3, fuel injection is started so that the fuel injection valves 17, which have been stopped from injecting fuel until the point in time t2, start injecting fuel of an amount corresponding to the required value QPD. Accordingly, the fuel cutoff process is cancelled, and the fuel introduction process is started.

As described above, the second embodiment has the following advantage in addition to the advantages (1) to (4).

(5) The second embodiment executes an ignition stop delaying process when starting the fuel cutoff process in the storing process. The ignition stop delaying process stops the spark discharge of the ignition devices 19 after a predetermined delay period has elapsed since the fuel injection of the fuel injection valves 17 were stopped. As a result, the spark discharge of the ignition devices 19 is continued until the delay period elapses after the fuel injection of the fuel injection valves 17 is stopped. This burns the fuel collecting on the intake ports 15a, which has been drawn into the cylinders 11 during the delay period, in the cylinders 11. Therefore, the fuel collected on the intake ports 15a is less likely to be discharged to the exhaust passage 21, so that an excessive amount of fuel is less likely to be supplied to the three-way catalyst 22.

The above-described embodiments may be modified as follows. The above-described embodiments and the following modifications can be combined as long as the combined modifications remain technically consistent with each other.

In order to determine whether the oxygen storage amount of the three-way catalyst 22 has reached the maximum oxygen storage amount, the process of S120 shown in FIG. 2 determines whether the accumulated air amount SGA is greater than or equal to the determination value α, or whether the downstream-side air-fuel ratio Afd is leaner than the stoichiometric air-fuel ratio. In addition, in the process of S120, which is executed to determine whether the oxygen storage amount of the three-way catalyst 22 has reached the maximum oxygen storage amount, only one of the processes may be executed, which include the process of determining whether accumulated air amount SGA is greater than or equal to the determination value α, and the process of determining whether the downstream-side air-fuel ratio Afd is leaner than stoichiometric air-fuel ratio.

Although the determination value α is variably set based on the catalyst temperature Tsc, the determination value α may be a fixed value.

The downstream air-fuel ratio Afd is detected by the second air-fuel ratio sensor 84, which outputs a signal corresponding to the oxygen concentration of the exhaust gas. Alternatively, the downstream-side air-fuel ratio Afd may be detected using an oxygen sensor that is only capable of detecting whether the air-fuel ratio is richer or leaner than the stoichiometric air-fuel ratio.

In the storing process, the motoring is performed along with the execution of the fuel cutoff process. Alternatively, the motoring does not necessarily performed in a drive system in which the crankshaft 14 is rotated by driving force from the driven wheels 62 when the hybrid vehicle is coasting while combustion of the internal combustion engine 10 is stopped. In the storing process, the fuel cutoff process may be executed under the situation where the crankshaft 14 is rotated by the power transmission from the driven wheels 62. Even in this case, the rotation of the crankshaft 14 causes intake and exhaust at the cylinders 11 of the internal combustion engine 10, so that air is supplied to the three-way catalyst 22. This allows the oxygen storage amount of the three-way catalyst 22 to be increased prior to the execution of the fuel introduction process.

In the storing process, the fuel cutoff process is executed until the oxygen storage amount of the three-way catalyst 22 reaches the maximum oxygen storage amount. However, the fuel cutoff process may be stopped and the fuel introduction process may be started before the maximum oxygen storage amount is reached. If the fuel cutoff process is executed with the crankshaft 14 rotating at least before starting the fuel introduction process, the three-way catalyst 22 is supplied with air and the oxygen storage amount of the three-way catalyst 22 is increases. This allows the fuel introduction process to be started with an increased oxygen storage amount of the three-way catalyst 22. Therefore, the oxygen storage amount of the three-way catalyst 22 is prevented from being insufficient during the execution of the fuel introduction process.

While the fuel introduction process is being executed, spark discharge of the ignition devices 19 is stopped. Alternatively, during the execution of the fuel introduction process, the spark discharge of the ignition devices 19 may be performed in a period in which the air-fuel mixture is not burned in the cylinders 11. For example, if spark discharge is performed when the piston in the cylinder 11 is located near the bottom dead center, the air-fuel mixture is not burned in the cylinder 11. Therefore, even if spark discharge is performed during the execution of the fuel introduction process, the fuel injected from the fuel injection valves 17 can be introduced into the exhaust passage 21 from inside the cylinders 11 without being burned.

In the first embodiment, the fuel introduction process is executed through the fuel injection into the intake ports 15a by the fuel injection valves 17. Alternatively, it is possible to execute the fuel introduction process through fuel injection into the cylinders 11 in an internal combustion engine equipped with fuel injection valves of a direction injection type, which inject fuel into the cylinders 11.

In the storing process of the first embodiment, both the fuel injection of the fuel injection valves 17 and the spark discharge of the ignition devices 19 are stopped when the fuel cutoff process is executed. However, only the fuel injection of the fuel injection valves 17 may be stopped. In this case also, since the three-way catalyst 22 is supplied with air by the execution of the fuel cutoff process, the oxygen storage amount of the three-way catalyst 22 is increased.

The system of the hybrid vehicle may be a system different from the system shown in FIG. 1 as long as the rotational speed of the crankshaft 14 is controlled by driving a motor.

The controller for an internal combustion engine according the present disclosure may be used to an internal combustion engine mounted on a vehicle that does not have a power source other than the internal combustion engine. Even in the internal combustion engine mounted on such a vehicle, combustion of air-fuel mixture in the cylinders 11 may be stopped when the crankshaft 14 is rotating by inertia. Thus, when both the fuel stop condition of air-fuel mixture and the execution condition of the fuel introduction process are satisfied, the temperature of the three-way catalyst 22 can be increased by executing the fuel introduction process.

The engine controller 100 is not limited to a device that includes the CPU 110 and the memory 120 and executes software processing. For example, a dedicated hardware circuit (such as an ASIC) may be provided that executes at least part of the software processing executed in each of the above-described embodiments. That is, the engine controller 100 may be modified as long as it has any one of the following configurations (a) to (c). (a) A configuration including a processor that executes all of the above-described processes according to programs and a program storage device such as a memory that stores the programs. (b) A configuration including a processor and a program storage device that execute part of the above-described processes according to the programs and a dedicated hardware circuit that executes the remaining processes. (c) A configuration including a dedicated hardware circuit that executes all of the above-described processes. A plurality of software processing circuits each including a processor and a program storage device and a plurality of dedicated hardware circuits may be provided. That is, the above processes may be executed in any manner as long as the processes are executed by processing circuitry that includes at least one of a set of one or more software processing circuits and a set of one or more dedicated hardware circuits.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for an internal combustion engine, wherein the internal combustion engine includes
    a fuel injection valve, which injects fuel,
    an ignition device, which performs spark discharge in a cylinder, and
    a three-way catalyst provided in an exhaust passage,
    the internal combustion engine is configured to ignite air-fuel mixture containing fuel injected from the fuel injection valve by spark discharge of the ignition device to burn the air-fuel mixture in the cylinder, and
the controller is configured to:
    when stopping combustion in the cylinder under a situation in which a crankshaft of the internal combustion engine is rotating, select and execute a fuel cutoff process of stopping fuel injection of the fuel injection valve and a fuel introduction process of injecting fuel from the fuel injection valve and introducing the fuel from inside the cylinder to the exhaust passage without burning the fuel; and
    execute a storing process of executing the fuel cutoff process to store oxygen in the three-way catalyst before starting the fuel introduction process, wherein the controller is configured to execute, in the storing process, the fuel cutoff process until an oxygen storage amount of the three-way catalyst reaches a maximum oxygen storage amount, which is a maximum value of an amount of oxygen that can be stored in the three-way catalyst.

2. The controller for an internal combustion engine according to claim 1, further comprising an intake air amount sensor, which detects an intake air amount of the internal combustion engine,
    wherein the controller is configured to determine, in the storing process, that the oxygen storage amount of the three-way catalyst has reached the maximum oxygen storage amount when an accumulated value of an intake air amount, which starts being accumulated after the fuel cutoff process is started, has become greater than or equal to a specified determination value.

3. The controller for an internal combustion engine according to claim 2, wherein the controller is configured to variably set the determination value based on a temperature of the three-way catalyst in the storing process.

4. The controller for an internal combustion engine according to claim 1, further comprising a sensor that is arranged in the exhaust passage on a downstream side of the three-way catalyst and detects an air-fuel ratio,
    wherein the controller is configured to determine, in the storing process, that the oxygen storage amount of the three-way catalyst has reached the maximum oxygen storage amount when a detection value of the sensor during execution of the fuel cutoff process indicates a value leaner than a stoichiometric value.

5. The controller for an internal combustion engine according to claim 1, wherein
    the fuel injection valve is a fuel injection valve that injects fuel to an intake port, and
    the controller is configured to execute an ignition stop delaying process when starting the fuel cutoff process in the storing process, the ignition stop delaying process being a process of stopping spark discharge of the ignition device after a predetermined delay period has elapsed since fuel injection of the fuel injection valve is stopped.

6. A controller for an internal combustion engine, wherein the internal combustion engine includes
    a fuel injection valve, which injects fuel,
    an ignition device, which performs spark discharge in a cylinder, and
    a three-way catalyst provided in an exhaust passage,
    the internal combustion engine is configured to ignite air-fuel mixture containing fuel injected from the fuel injection valve by spark discharge of the ignition device to burn the air-fuel mixture in the cylinder, and
    the controller includes circuitry that is configured to:

when stopping combustion in the cylinder under a situation in which a crankshaft of the internal combustion engine is rotating, select and execute a fuel cutoff process of stopping fuel injection of the fuel injection valve and a fuel introduction process of injecting fuel from the fuel injection valve and introducing the fuel from inside the cylinder to the exhaust passage without burning the fuel; and execute a storing process of executing the fuel cutoff process to store oxygen in the three-way catalyst before starting the fuel introduction process, wherein the controller is configured to execute, in the storing process, the fuel cutoff process until an oxygen storage amount of the three-way catalyst reaches a maximum oxygen storage amount, which is a maximum value of an amount of oxygen that can be stored in the three-way catalyst.

7. A control method for an internal combustion engine, wherein the internal combustion engine includes
a fuel injection valve, which injects fuel,
an ignition device, which performs spark discharge in a cylinder, and
a three-way catalyst provided in an exhaust passage, the internal combustion engine is configured to ignite air-fuel mixture containing fuel injected from the fuel injection valve by spark discharge of the ignition device to burn the air-fuel mixture in the cylinder, and the control method comprises:

when stopping combustion in the cylinder under a situation in which a crankshaft of the internal combustion engine is rotating, selecting and executing a fuel cutoff process of stopping fuel injection of the fuel injection valve and a fuel introduction process of injecting fuel from the fuel injection valve and introducing the fuel from inside the cylinder to the exhaust passage without burning the fuel; and executing a storing process of executing the fuel cutoff process to store oxygen in the three-way catalyst before starting the fuel introduction process, wherein the controller is configured to execute, in the storing process, the fuel cutoff process until an oxygen storage amount of the three-way catalyst reaches a maximum oxygen storage amount, which is a maximum value of an amount of oxygen that can be stored in the three-way catalyst.

* * * * *